United States Patent
VanBlon et al.

(10) Patent No.: US 10,032,071 B2
(45) Date of Patent: Jul. 24, 2018

(54) CANDIDATE HANDWRITING WORDS USING OPTICAL CHARACTER RECOGNITION AND SPELL CHECK

(71) Applicant: Lenovo (Singapore) Pte. Ltd., Singapore (SG)

(72) Inventors: Russell Speight VanBlon, Raleigh, NC (US); Joshua Neil Novak, Wake Forest, NC (US); Steven Richard Perrin, Raleigh, NC (US); Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 109 days.

(21) Appl. No.: 14/580,679

(22) Filed: Dec. 23, 2014

(65) Prior Publication Data
US 2016/0179941 A1  Jun. 23, 2016

(51) Int. Cl.
*G06F 17/00* (2006.01)
*G06K 9/00* (2006.01)
*G06F 17/24* (2006.01)
*G06F 3/0488* (2013.01)

(52) U.S. Cl.
CPC ......... *G06K 9/00422* (2013.01); *G06F 17/24* (2013.01); *G06F 17/242* (2013.01); *G06F 3/04883* (2013.01)

(58) Field of Classification Search
CPC .. G06F 17/242; G06F 17/273; G06F 3/04883; G06K 9/00402
USPC .......................................... 715/257, 263, 268
See application file for complete search history.

(56) References Cited

U.S. PATENT DOCUMENTS

| | | | | |
|---|---|---|---|---|
| 4,379,288 A | * | 4/1983 | Leung | G06F 3/018 341/28 |
| 6,044,165 A | * | 3/2000 | Perona | G06K 9/222 345/179 |
| 6,618,697 B1 | * | 9/2003 | Kantrowitz | G06F 17/273 703/2 |
| 7,174,043 B2 | | 2/2007 | Lossev et al. | |
| 7,319,957 B2 | | 1/2008 | Robinson et al. | |
| 7,895,205 B2 | * | 2/2011 | Qin | G06F 17/30616 707/736 |

(Continued)

FOREIGN PATENT DOCUMENTS

KR        100814909 B1     3/2008

OTHER PUBLICATIONS

Kristensson et al., Shark: A Large Vocabulary Shorthand Writing System for Pen-based Computers, ACM 2004, pp. 43-52.*

(Continued)

*Primary Examiner* — Cong-Lac Huynh
(74) *Attorney, Agent, or Firm* — Ference & Associates LLC

(57) ABSTRACT

One embodiment provides a method, including: receiving, in an overlay handwriting application, one or more handwriting strokes; processing the one or more handwriting strokes to obtain at least one candidate machine input word; generating, using a spell check application, at least one spell check word using the at least one candidate machine input word; and providing, on a display device, the at least one spell check word generated by the spell check application. Other embodiments are described and claimed.

20 Claims, 3 Drawing Sheets

(56) References Cited

U.S. PATENT DOCUMENTS

| | | | | |
|---|---|---|---|---|
| 8,074,184 | B2* | 12/2011 | Garside | G06F 3/04883 382/186 |
| 8,413,069 | B2* | 4/2013 | Blair | G06F 3/0237 345/168 |
| 8,972,253 | B2 | 3/2015 | Deng et al. | |
| 9,355,090 | B2* | 5/2016 | Goldsmith | G06F 3/018 |
| 2004/0021700 | A1 | 2/2004 | Iwema et al. | |
| 2005/0099398 | A1* | 5/2005 | Garside | G06F 17/242 345/173 |
| 2005/0128181 | A1* | 6/2005 | Wang | G06K 9/00436 345/156 |
| 2005/0135678 | A1* | 6/2005 | Wecker | G06F 3/04883 382/186 |
| 2006/0190819 | A1* | 8/2006 | Ostergaard | G06F 3/0237 715/210 |
| 2009/0015567 | A1* | 1/2009 | Abdelbaki | G06F 3/03545 345/179 |
| 2009/0055381 | A1* | 2/2009 | Wu | G06F 17/2745 |
| 2009/0228468 | A1* | 9/2009 | Qin | G06F 17/30616 |
| 2010/0161733 | A1* | 6/2010 | Bower | G06F 3/0237 709/206 |
| 2011/0201387 | A1* | 8/2011 | Paek | G06F 3/0237 455/566 |
| 2012/0014601 | A1* | 1/2012 | Jiang | G06F 1/1626 382/173 |
| 2013/0011066 | A1* | 1/2013 | Balassanian | G06F 3/04883 382/189 |
| 2013/0205204 | A1* | 8/2013 | Qiu | G06F 17/273 715/257 |
| 2014/0270382 | A1* | 9/2014 | Cheng | G06K 9/00355 382/104 |
| 2015/0035765 | A1* | 2/2015 | Hirabayashi | G06K 9/00436 345/173 |
| 2015/0169975 | A1* | 6/2015 | Kienzle | G06K 9/34 382/189 |
| 2015/0193141 | A1* | 7/2015 | Goldsmith | G06F 3/04883 345/173 |
| 2015/0254425 | A1 | 9/2015 | Pauletto et al. | |
| 2016/0026621 | A1* | 1/2016 | Misra | G06F 17/2785 704/9 |
| 2016/0142435 | A1* | 5/2016 | Bernstein | H04L 63/1425 726/23 |
| 2016/0179758 | A1* | 6/2016 | Perrin | G06F 17/212 715/259 |
| 2016/0253992 | A1* | 9/2016 | Raux | G06K 9/00402 |
| 2017/0344170 | A1* | 11/2017 | Billerbeck | G06F 3/0416 |

OTHER PUBLICATIONS

Oprean et al., BLSTM-based Handwritten Text Recognition Using Web Resources, IEEE 2015, pp. 466-470.*

Rayner et al., A Unified Approach to On-line Cursive Script Segmentation and Feature Extraction, IEEE 1989, pp. 1659-1662.*

Read et al., Oops! Silly Me! Errors in a Handwriting Recognition-based Text Entry Interface for Children, ACM 2002, pp. 35-40.*

Kukich, Techniques for Automatically Correcting Words in Text, ACM 1992, pp. 377-439.*

Navarro, A Guided Tour to Approximate String Matching, ACM 2001, pp. 31-88.*

McDonald et al., The Writer's Workbench: Computer Aids for Text Analyis, IEEE 1982; pp. 105-110.*

Madhvanath et al., The Role of Holistic Paradigms in Handwritten Word Recognition, IEEE 2001, pp. 149-164.*

"Review: WritePad—Handwriting Recognition for iPad", Aug. 13, 2013, 2 pages. Available at: http://www.mactrast.com/2013/08/review-writepad-handwriting-recognition-for-ipad/ Last accessed Sep. 8, 2016.

Bharath, A. et al., "FreePad: A Novel Handwriting-based Text Input for Pen and Touch Interfaces", Proceedings of the 13th International Conference in Intelligent User Interfaces, ACM, 2008, pp. 297-300.

Koerich et al., "Recognition and Verification of Unconstrained Handwritten Words", IEEE Transactions on Pattern Analysis and Machine Intelligence, vol. 27, No. 10, Oct. 2005, pp. 1509-15022.

* cited by examiner

CANDIDATE HANDWRITING WORDS USING OPTICAL CHARACTER RECOGNITION AND SPELL CHECK

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box or pane is presented to the user as an overlay, e.g., a rectangle in a lower portion of a touch screen display. In this area the user may provide input handwriting strokes, e.g., letters, numbers, characters, symbols, etc. The device employs software that uses the input handwriting strokes, which are generally presented on screen to provide visual feedback to the user, as input by converting the handwriting stroke input locations on the touch screen into machine text according to the language setting of the device. Alternatively, a graphic or image of unconverted handwriting input may be placed into an underlying application, e.g., an image of the user's signature.

While various methods are employed, logic is applied to detect the particular handwriting input, e.g., detecting that the handwriting strokes form a letter, a number, a character, a symbol, etc. These methods are collectively referred to herein as handwriting recognition. As part of the process of recognizing handwriting input strokes as machine input, e.g., a letter, a number, a character, a symbol, candidate machine inputs are produced. For example, handwriting input strokes of a cursive letter "v" may be scored as 90 percent likely machine input "v" and 50 percent likely machine input "u." As this process progresses for consecutive characters, candidate letters and words may be generated based on the processed handwriting inputs. The candidate words are scored to select an input word, referred to herein as a machine input word. The machine input word selected is provided to an underlying application and presented as typeset in the display, with the machine input word itself being used as the basis for offering a spell checking function.

BRIEF SUMMARY

In summary, one aspect provides a method, comprising: receiving, in an overlay handwriting application, one or more handwriting strokes; processing the one or more handwriting strokes to obtain at least one candidate machine input word; generating, using a spell check application, at least one spell check word using the at least one candidate machine input word; and providing, on a display device, the at least one spell check word generated by the spell check application.

Another aspect provides an electronic device, comprising: an input and display device; a processor; and a memory device that stores instructions executable by the processor to receive, in an overlay handwriting application, one or more handwriting strokes; process the one or more handwriting strokes to obtain at least one candidate machine input word; generate, using a spell check application, at least one spell check word using the at least one candidate machine input word; and provide, on the display device, the at least one spell check word generated by the spell check application.

A further aspect provides a product, comprising: a storage device having code stored therewith, the code being executable by a processor of an electronic device and comprising: code that receives, in an overlay handwriting application, one or more handwriting strokes; code that processes the one or more handwriting strokes to obtain at least one candidate machine input words; code that generates, using a spell check application, at least one spell check word using the at least one candidate machine input word; and code that provides, on a display device, the at least one spell check word generated by the spell check application.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
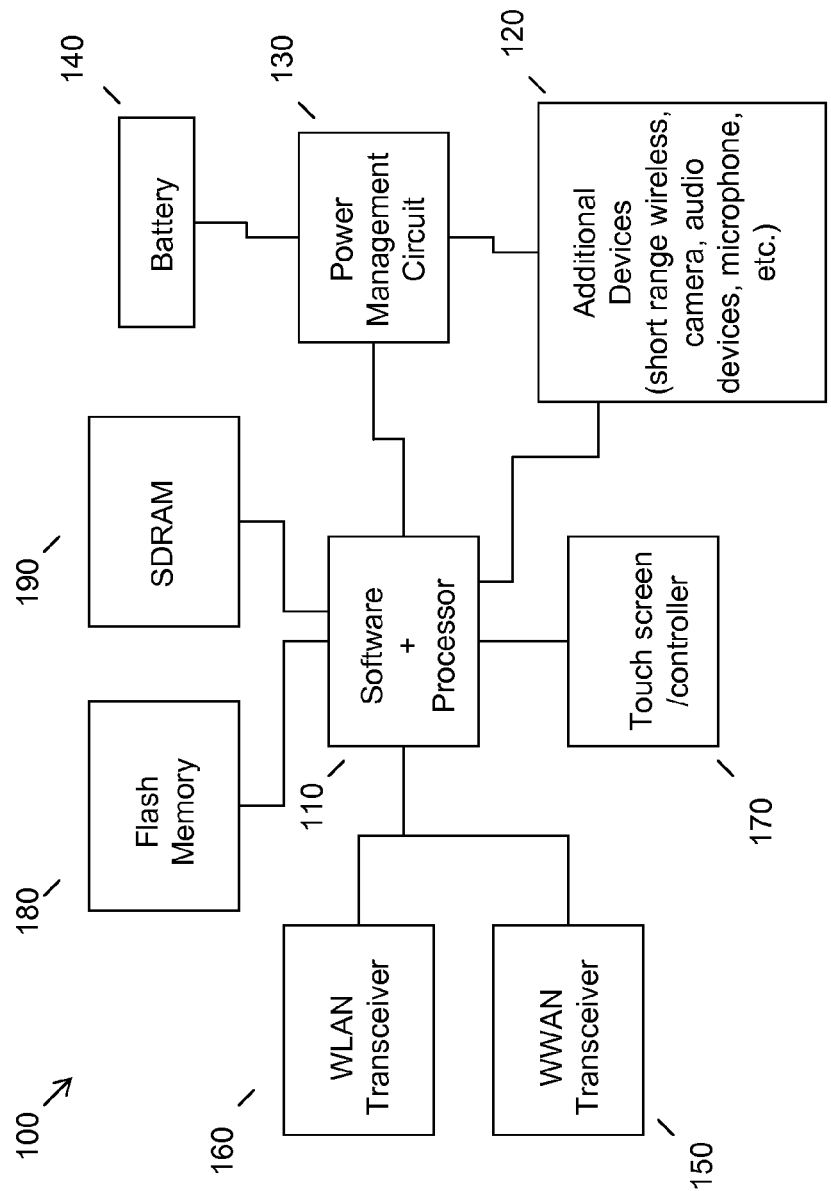
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When writing with a pen/stylus or finger, the user will typically select a word that needs to be corrected or altered after his or her handwriting strokes have been converted into machine input, e.g., via an handwriting recognition processing. Here a note of caution is in order, as the term machine input word may not be a proper word, e.g., it may be an incorrectly spelled word, a slang word, an acronym, etc.

Thus, machine input word is used to refer to the string of machine typeset characters generated by processing the handwriting input.

If the user selects a word that needs to be corrected or adjusted (or one is selected for the user), the user is then presented with a list of spell check suggestions for that word. Currently, the top handwriting recognition result (determined machine input word) is run through a spell checker function to determine a list of suggested spell check words.

A problem occurs however in the accuracy of this method. The word intended to be written by the user is not always presented to the user in the list of spell check suggestions since the converted machine input used as the basis of the spell checking might be wrong in and of itself. That is, a handwriting recognition engine returns multiple candidates and usually the highest ranked candidate is chosen as input. Because handwriting recognition processing results have a margin of error, the spell check process may be run against the wrong base word.

When this occurs, the user may delete the word and re-write the word or reverse the typeset text to handwritten strokes and edit the handwritten strokes. Alternatively, the user may provide input with a (soft) keyboard if a word isn't interpreted correctly. All of these approaches side step the issue, where ultimately what is needed is a providing of the best list of spell check candidate words or corrections in the first place.

Accordingly, an embodiment combines handwriting recognition results and spell check results to present the user with the actual, correct word they intended to hand write, included in the spell check results. By way of example, an embodiment may take all handwriting recognition candidates (or a sub-set thereof) into account instead of selecting the highest ranked handwriting recognition candidate. Each handwriting recognition candidate then may be run through a spell check process to determine possible word alternatives for each. This is done for each handwriting recognition candidate, and all spell check alternatives are compared. The lists of spell check suggestions are then tallied, and the user is presented with the list spell check alternatives, e.g., the ones that appear most frequently in the lists from each handwriting recognition list.

By way of specific example, if the user hand writes the word "ball" with a pen on a touch screen, three handwriting recognition candidates may be returned in this order: bull, bell, and bail. Each handwriting recognition candidate is then run through a spell check process that results in multiple spell check candidates for each handwriting recognition candidate.

Within those spell check candidates, the word "ball" may be suggested from the spell checking process for all three handwriting recognition candidates. Since "ball" has been returned as a spell check suggestion for all handwriting recognition candidates, "ball" may be returned as a likely intended word.

If only a subset of handwriting recognition candidates returns a common spell check suggestion, it may be weighted and ranked along with the handwriting recognition candidate confidence score. In the example above, if "bull" was a 90 percent likely handwriting recognition candidate, its spell check suggestions may also carry a higher weighting when tallying up spell check candidates. In other words, rankings may be applied to each spell check candidate, where the weighting correlates to the handwriting recognition confidence and/or rank for each handwriting recognition alternative, in addition to the spell check confidence and/or rank for each spell check suggestion.

Rankings may be based on, for example, the number of appearances as spell check suggestion, handwriting recognition rankings, or a combination of both. As will be apparent to those having skill in the art, the specific scoring techniques mentioned above as examples need not be utilized. Rather, the technique need only combine handwriting recognition candidate processing with spell check processing in some way to achieve improved results in terms of better identifying word alternatives displayed to the user and/or to shorten the list of possible words displayed to the user. A minimum number of spell check results may be used to filter spell check suggestions and to get the list of candidate words to a manageable size. For example in the scenario above, only spell check word suggestions that appear three or more times (e.g., for three or more candidate machine input words) might be displayed in the list to the user.

The correct (intended) word may be one of the handwriting recognition candidates. In this case, the filtering method may still be helpful in identifying/narrowing out other words that are low-confidence based on their number of appearances as spell check results.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering. System 100 also typically includes various memory devices, for example flash memory 180 and SDRAM 190.

Figure 2:
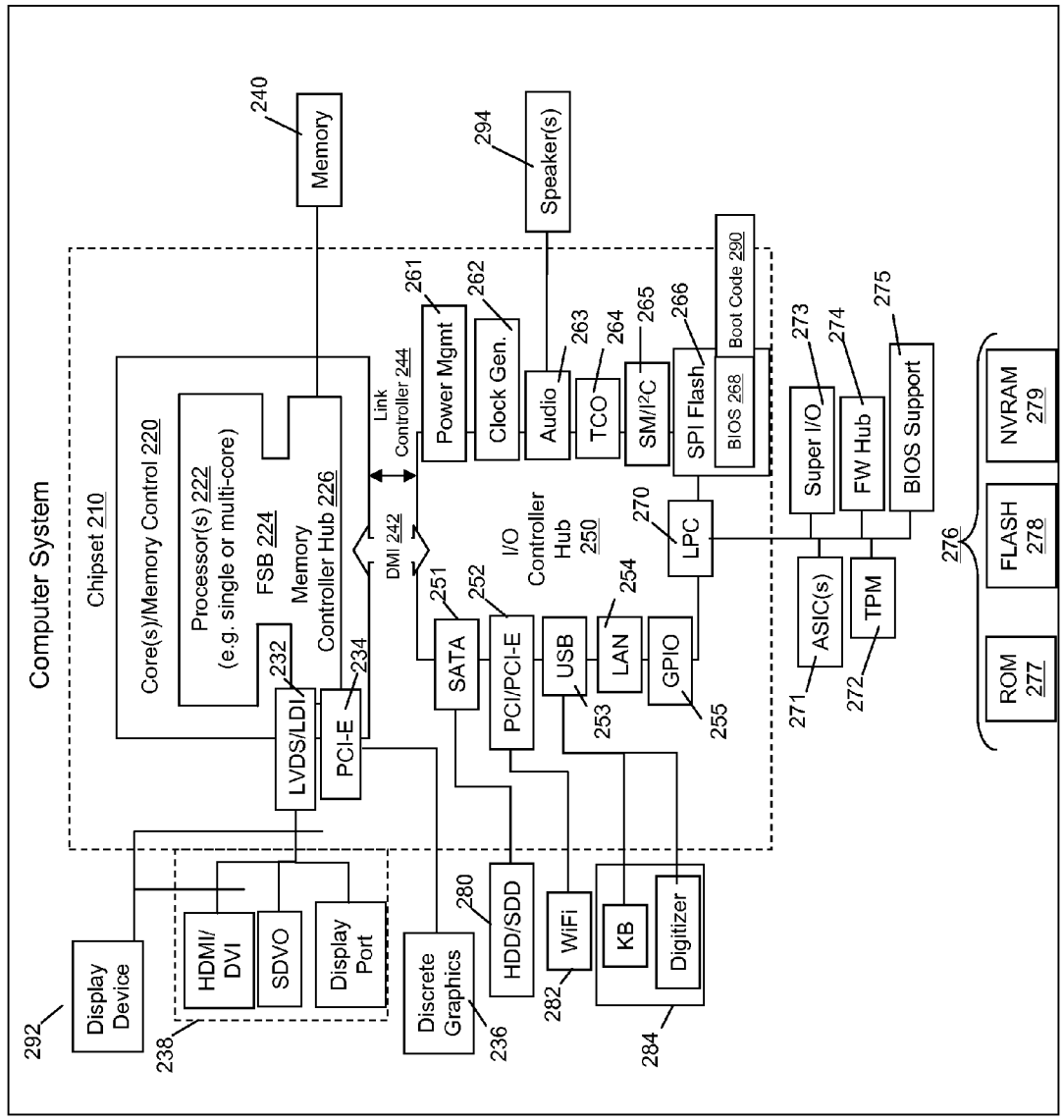
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric input/security devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or other electronic devices. Users may employ these devices for various functions, e.g., inputting handwriting strokes as an input modality to an Internet search application, an email application, a text messaging or instant messaging application, with fillable forms, etc. For example, the circuitry outlined in FIG. 1 may be implemented in a tablet or smart phone embodiment, whereas the circuitry outlined in FIG. 2 may be implemented in a laptop personal computer embodiment. In each case, the device may include an input and display device, e.g., a touch screen or the like, which acts to accept handwriting strokes and provides visual displays of input characters, conversions of handwritten characters or strokes to machine text, presentation of candidate replacement or alternative words and the like.

Figure 3:
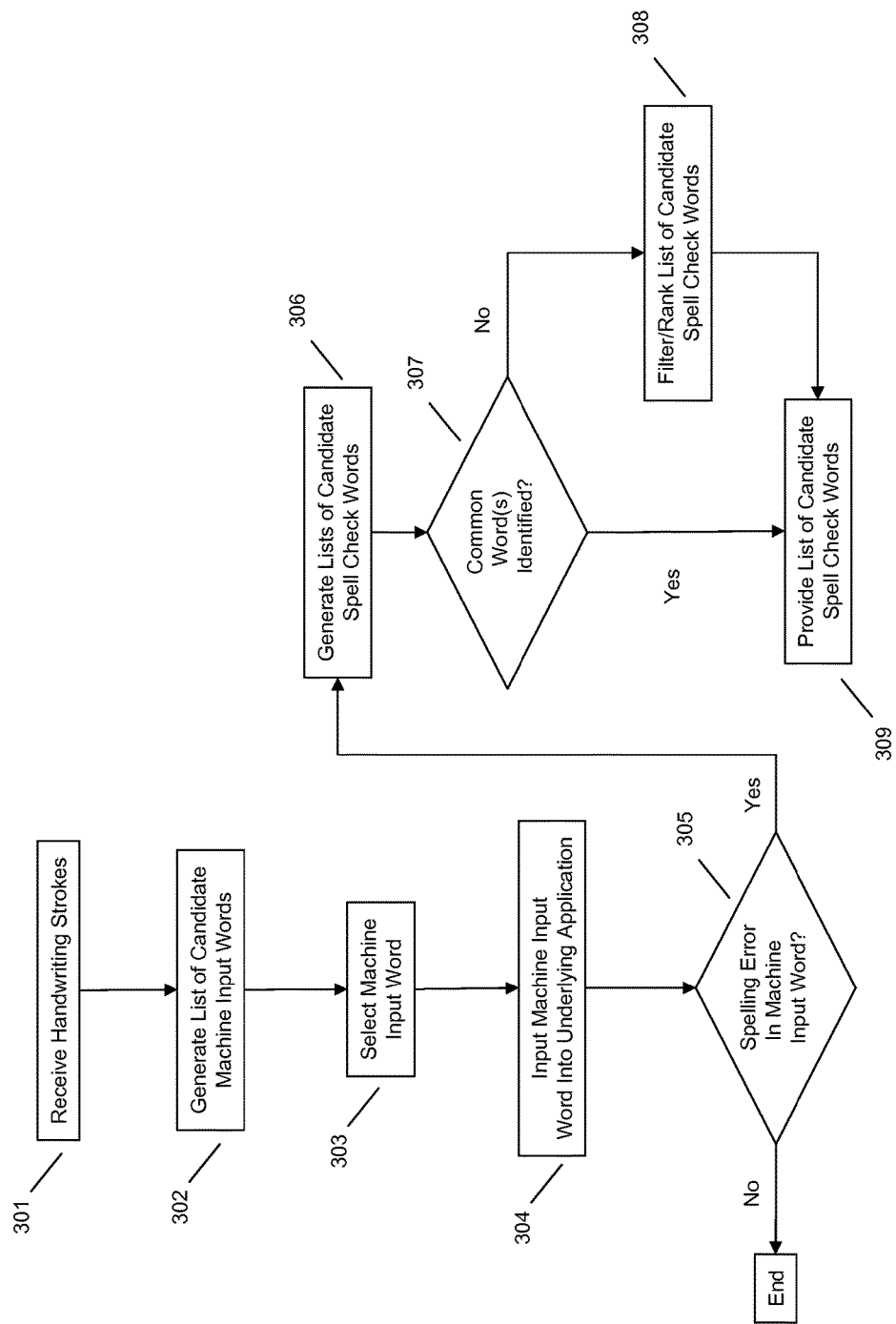
FIG. 3 illustrates an example of generating candidate handwriting words using optical character recognition and spell check processing.

Referring now to FIG. 3, when handwriting strokes are received in an overlay handwriting application at 301, a handwriting recognition engine or like utility identifies the strokes as being machine input (e.g., letters, numbers, characters, etc.). This processing includes evaluation of the handwriting strokes to generate a list of candidate machine input words at 302 and selecting, from the list of candidate machine input words, a machine input word at 303. The selected machine input word then may be inserted into the underlying application, e.g., the machine word may be input into a text field of an underlying application, as indicated at 304. This machine input word also may be presented in a preview, e.g., a pop up window or bubble, etc., in addition to or in lieu of inputting the machine input word into the underlying application.

An embodiment determines alternative words for the machine input word. For example, if a spelling error is detected in the machine input word, e.g., as indicated at 305, an embodiment may generate, using a spell check application, a list of candidate spell check words at 306. This process may be conducted whether or not there is an actual spelling error present. Here, instead of simply using the machine input word selected at 303 as the basis for the spell check processing, an embodiment uses the machine input word and one or more of the candidate machine input words, e.g., from the candidate list generated at 302.

Thus, an embodiment intelligently utilizes the candidate list of machine input words as part of the spell check process conducted at 306, recognizing that in fact the originally input machine word may not have been selected in accordance with the user's intention. Therefore, an embodiment may filter (e.g., cull, reduce) and/or rank (e.g., promote, reorder, etc.) a list of candidate words produced by the spell checker on the basis of inclusion of the machine input word candidates in the spell checking process.

By way of example, as illustrated in FIG. 3, if there are commonalities between the list of candidate machine input words and the candidate spell checker words, as determined at 307, this may be used as the basis for filtering out non-common words or in prioritizing/promoting common words in the provided list. Thus, an embodiment may provide at 309, e.g., in a display device, the list of spell check candidate words generated by the spell check application. Naturally, if no such common words exist, as determined at 307, an embodiment may nonetheless provide a candidate list of spell check words at 309, e.g., using some other filtering or ranking scheme, as further described herein.

By way of example, the filtering may include weighting the spell check candidate words according to a spell check confidence score. These scores need not simply be based on the root machine input word, but may also include scoring generated for words from the list of candidate machine input words.

Moreover, as another example, the filtering may include weighting spell check candidate words according to a candidate machine input score. In other words, the spell check list of words may be compiled (e.g., filtered) by taking into account a machine input word's candidate identification score produced at 302. This may influence which words are included or excluded by filtering, as a high confidence spell check score may be reduced by a low weighted handwriting recognition confidence score.

The example techniques mentioned above may also be used in ranking or ordering of the spell check candidate words, either before or after they are filtered, after they are filtered, or in lieu of filtering. For example, ranking of the spell check words generated by the spell check application may be conducted prior to the providing of the candidate list and/or the filtering of the candidate list. In one example, the filtering may be based on the ranking.

The ranking may therefore include promoting words included in both the list of candidate machine input words and the list of spell check candidate words, e.g., as determined at 307. The ranking may include weighting the list of spell check candidate words according to a spell check confidence score and/or a candidate machine input score, e.g., as produced by handwriting recognition processing.

An embodiment therefore represents a technical improvement in generating a list of spell check (recommended) words to be presented to a user. This assists the user by more intelligently linking the spell checking process to the context of handwriting input, which inherently introduces some error factor at the point of generating and selecting a machine input word. The various embodiments produce a candidate list of spell check words that more closely match the user's original intention by taking into consideration the handwriting input modality.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, in an overlay handwriting application, one or more handwriting strokes;
processing the one or more handwriting strokes to obtain a plurality of handwriting recognition results;
automatically generating at least one candidate word for each of the plurality of handwriting recognition results, one of the at least one candidate words comprising at least one letter that is different from a recognized letter of the corresponding handwriting recognition result;
determining, using a processor and based on the generating, that there is a common candidate word from the candidate words for the plurality of handwriting recognition results; and
providing, on a display device, the common candidate word.

2. The method of claim 1, further comprising:
selecting, from the plurality of handwriting recognition results, a machine input word;
wherein the generating comprises, generating a list comprising at least one candidate word; and
wherein the providing comprises, providing the generated list.

3. The method of claim 2, further comprising filtering the list comprising at least one candidate word prior to the providing.

4. The method of claim 3, wherein the filtering comprises selecting words included in two or more lists comprising at least one candidate word.

5. The method of claim 3, wherein the filtering comprises weighting the list comprising at least one candidate word according to a spell check confidence score.

6. The method of claim 3, wherein the filtering comprises weighting the list comprising at least one candidate word according to a candidate machine input score.

7. The method of claim 1, further comprising ranking the list comprising at least one candidate word prior to the providing.

8. The method of claim 7, wherein the ranking comprises promoting words included in two or more lists comprising at least one candidate word.

9. The method of claim 7, wherein the ranking comprises weighting the list comprising at least one candidate word according to a spell check confidence score.

10. The method of claim 7, wherein the ranking comprises weighting the list comprising at least one candidate word according to a candidate machine input score.

11. An electronic device, comprising:
an input and display device;
a processor; and
a memory device that stores instructions executable by the processor to:
receive, in an overlay handwriting application, one or more handwriting strokes;
process the one or more handwriting strokes to obtain a plurality of handwriting recognition results;
automatically generate at least one candidate word for each of the plurality of handwriting recognition results, one of the at least one candidate words comprising at least one letter that is different from a recognized letter of the corresponding handwriting recognition result;
determine, based on the generate, that there is a common candidate word from the candidate words for the plurality of handwriting recognition results; and
provide, on the display device, the common candidate word.

12. The electronic device of claim 11, wherein the instructions are executable by the processor to:
select, from the plurality of handwriting recognition results, a machine input word;
wherein the generating comprises, generating a list comprising at least one candidate word; and
wherein the providing comprises, providing the generated list.

13. The electronic device of claim 12, wherein the instructions are executable by the processor to: filter the list comprising at least one candidate word prior to the providing.

14. The electronic device of claim 13, wherein to filter comprises selecting words included in two or more lists comprising at least one candidate word.

15. The electronic device of claim 13, wherein to filter comprises weighting the list comprising at least one candidate word according to a spell check confidence score.

16. The electronic device of claim 13, wherein to filter comprises weighting the list comprising at least one candidate word according to a candidate machine input score.

17. The electronic device of claim 12, wherein the instructions are executable by the processor to: rank the list comprising at least one candidate word generated by the spell check application prior to the providing.

18. The electronic device of claim 17, wherein to rank comprises promoting words included in two or more lists comprising at least one candidate word.

19. The electronic device of claim 17, wherein to rank comprises weighting the list comprising at least one candidate word according to a spell check confidence score.

20. A product, comprising:
a storage device having code stored therewith, the code being executable by a processor of an electronic device and comprising:
code that receives, in an overlay handwriting application, one or more handwriting strokes;
code that processes the one or more handwriting strokes to obtain a plurality of handwriting recognition results;
code that automatically generates at least one candidate word for each of the plurality of handwriting recognition results, one of the at least one candidate words comprising at least one letter that is different from a recognized letter of the corresponding handwriting recognition result;
code that determines, based on the generating, that there is a common candidate word from the candidate words for the plurality of handwriting recognition results; and
code that provides, on a display device, the common candidate word.

* * * * *